US012608218B2

(12) United States Patent
Eker et al.

(10) Patent No.: US 12,608,218 B2
(45) Date of Patent: Apr. 21, 2026

(54) METHODS AND APPARATUS FOR MODIFYING AN ALLOCATION OF VIRTUALIZED PROCESSING RESOURCES FOR A DIGITAL UNIT BASED ON TIMING FEEDBACK FROM A RADIO UNIT

(71) Applicant: Telefonaktiebolaget LM Ericsson (publ), Stockholm (SE)

(72) Inventors: Johan Eker, Lund (SE); Edgard Fiallos, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 844 days.

(21) Appl. No.: 17/278,943

(22) PCT Filed: Sep. 26, 2018

(86) PCT No.: PCT/EP2018/076165
§ 371 (c)(1),
(2) Date: Mar. 23, 2021

(87) PCT Pub. No.: WO2020/064103
PCT Pub. Date: Apr. 2, 2020

(65) Prior Publication Data
US 2021/0382745 A1      Dec. 9, 2021

(51) Int. Cl.
*G06F 9/455*      (2018.01)
*G06F 9/50*      (2006.01)
(52) U.S. Cl.
CPC ........ *G06F 9/45558* (2013.01); *G06F 9/5077* (2013.01); *G06F 2009/45595* (2013.01)

(58) Field of Classification Search
None
See application file for complete search history.

(56) References Cited

U.S. PATENT DOCUMENTS 11,836,125 B1 * 12/2023 Skinner .............. G06F 16/9024
2008/0120621 A1     5/2008 Yamatsu et al.
(Continued)

OTHER PUBLICATIONS

Faggioli, Dario, "Scheduling in The Age of Virtualization", Presentation, Bruxelles, Jan. 30, 2016, 1-17.
(Continued)

*Primary Examiner* — Wynuel S Aquino
(74) *Attorney, Agent, or Firm* — Murphy, Bilak & Homiller, PLLC

(57) ABSTRACT

Example methods and apparatus disclosed herein use the "processing margin" at a radio unit (RU) (24) as a control variable for modifying the allocation of virtualized processing resources used by a digital unit (DU) (16) that supports the RU (24). The DU (16) and RU (24) form a radio processing chain with a functional split, in which the DU (16) performs certain processing operations and provides corresponding processed data to the RU (24), which performs further processing for the generation and transmission of the corresponding radio signals. The "slack" between the end of processing in the RU (24) and the corresponding required transmission time represents the processing margin. The processing-margin feedback loop allows for the virtualization of all or part the DU (16), while avoiding the need for the network operator to implement or pay for over-dimensioning of the DU (16), as would be needed to ensure that a static resource allocation meets worst-case processing needs.

13 Claims, 5 Drawing Sheets

(56)　　　　　　References Cited

U.S. PATENT DOCUMENTS

| | | | |
|---|---|---|---|
| 2009/0300730 A1* | 12/2009 | Chaudhry | H04L 63/1441 |
| | | | 726/5 |
| 2010/0186011 A1* | 7/2010 | Magenheimer | G06F 12/084 |
| | | | 718/1 |
| 2014/0115578 A1* | 4/2014 | Cooper | H04L 63/205 |
| | | | 718/1 |
| 2016/0241351 A1* | 8/2016 | Suzuki | H04L 27/2602 |
| 2017/0017562 A1* | 1/2017 | Gulkis | H04W 4/60 |
| 2017/0054658 A1* | 2/2017 | Min | G06F 9/54 |
| 2018/0054791 A1* | 2/2018 | Pasulka | H04W 28/24 |
| 2020/0145873 A1* | 5/2020 | Park | H04W 28/0284 |
| 2020/0260317 A1* | 8/2020 | Francini | H04W 80/02 |

OTHER PUBLICATIONS

Krishnam Raju, Indukuri R., et al., "Deadline Aware Two Stage Scheduling Algorithm in Cloud Computing", Indian Journal of Science and Technology, vol. 9, Issue 4, Jan. 2016, 1-10.
Masmano, M., et al., "XtratuM: a Hypervisor for Safety Critical Embedded Systems", 11th Real-Time Linux Workshop, Dresden, Germany, Sep. 2009, 1-9.
Xi, S., et al., "RT-Xen: Towards real-time hypervisor scheduling in Xen", 2011 Proceedings of the Ninth ACM International Conference on Embedded Software (EMSOFT), Taipei, Oct. 2011, 39-48.

* cited by examiner

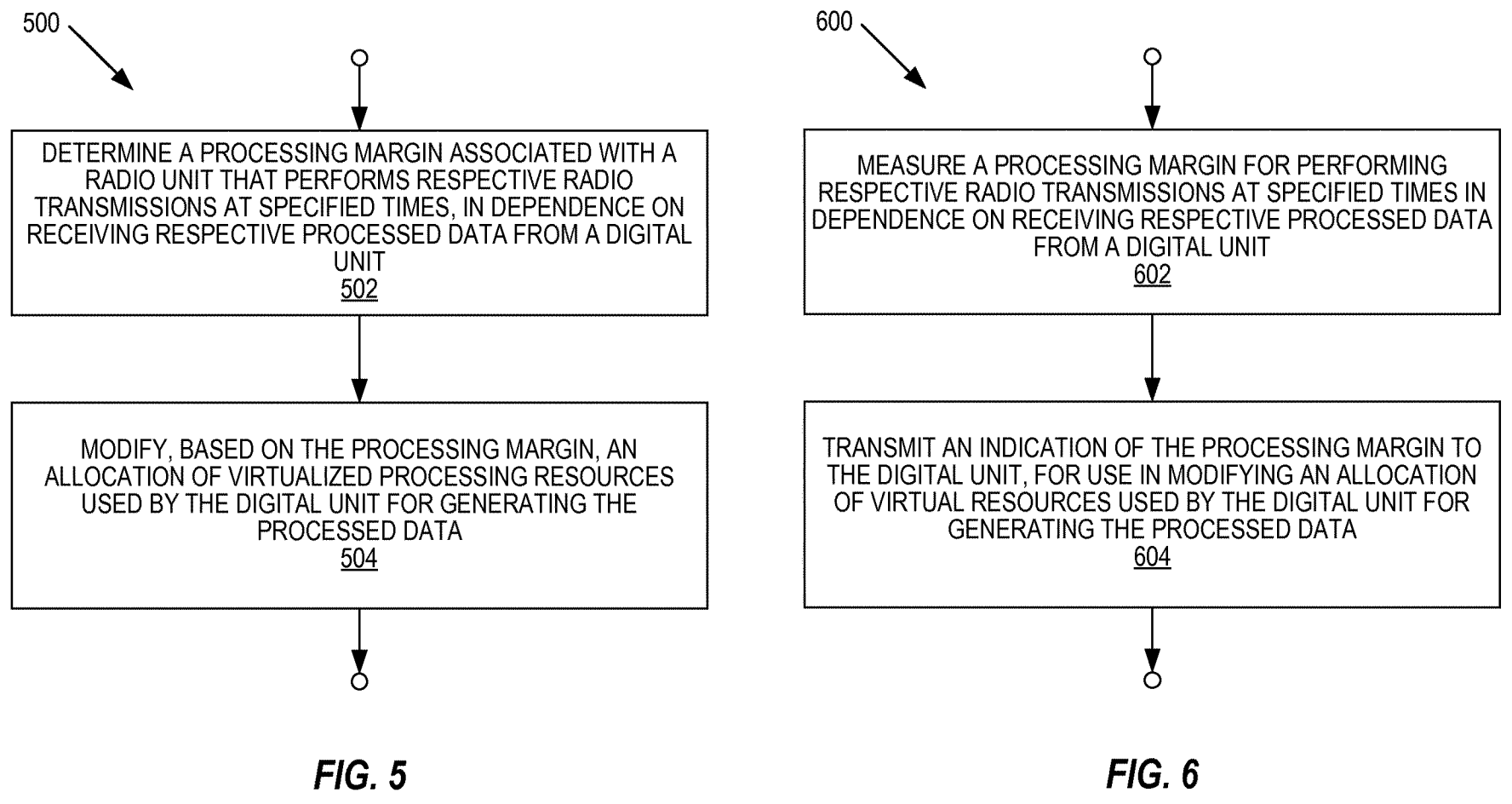

600

MEASURE A PROCESSING MARGIN FOR PERFORMING RESPECTIVE RADIO TRANSMISSIONS AT SPECIFIED TIMES IN DEPENDENCE ON RECEIVING RESPECTIVE PROCESSED DATA FROM A DIGITAL UNIT
602

TRANSMIT AN INDICATION OF THE PROCESSING MARGIN TO THE DIGITAL UNIT, FOR USE IN MODIFYING AN ALLOCATION OF VIRTUAL RESOURCES USED BY THE DIGITAL UNIT FOR GENERATING THE PROCESSED DATA
604

DETERMINE A PROCESSING MARGIN ASSOCIATED WITH A RADIO UNIT THAT PERFORMS RESPECTIVE RADIO TRANSMISSIONS AT SPECIFIED TIMES, IN DEPENDENCE ON RECEIVING RESPECTIVE PROCESSED DATA FROM A DIGITAL UNIT
502

MODIFY, BASED ON THE PROCESSING MARGIN, AN ALLOCATION OF VIRTUALIZED PROCESSING RESOURCES USED BY THE DIGITAL UNIT FOR GENERATING THE PROCESSED DATA
504

FIG. 5

METHODS AND APPARATUS FOR MODIFYING AN ALLOCATION OF VIRTUALIZED PROCESSING RESOURCES FOR A DIGITAL UNIT BASED ON TIMING FEEDBACK FROM A RADIO UNIT

TECHNICAL FIELD

The present disclosure generally relates to wireless communication networks and particularly relates to modifying an allocation of virtualized processing resources used by a digital unit to process data for transmission by a radio unit in a wireless communication network.

BACKGROUND

Known and developing wireless communication networks may use a "split" arrangement, where a digital unit (DU) and a radio unit (RU) cooperate to perform over-the-air (OTA) transmission and reception of data, for one or more wireless devices operating in a coverage area of the RU. Various implementations are used for making the "fronthaul" connection between a DU and each of the one or more RUs it supports. The corresponding "split" between the DU and the RU regarding RF signal generation and processing and corresponding baseband processing depends on the particular implementation details.

One approach uses the "Common Public Radio Interface", which may be supported via a fiber-optic link between the DU and the RU, for example. In a known implementation approach, and taking the downlink direction as an example case, the DU receives user traffic for transmission to one or more wireless devices and it generates In-phase and Quadrature (I/Q) baseband waveform samples, for output to the RU. The RU performs corresponding radio transmissions, based on the I/Q data output to it from the DU.

However, the above approach requires significant fronthaul bandwidth and developing strategies contemplate splitting the radio processing chain at different points, possibly in conjunction with using Ethernet-based other datacentric fronthaul links Thus, the extent and nature of processing done by the DU and the RU, respectively, depends on the fronthaul connection and the applicable radio processing architecture according to which the DU/RU "split" is made. As such, in some implementations, the DU may be responsible for certain physical-layer (PHY Layer) processing, such as beamforming control, while the RU performs such functions in other implementations.

In all cases, however, it will be appreciated that the radio processing chain is functionally split between the DU and the RU. Thus, taking the downlink direction as an example case, the DU produces data for the RU, with the nature and content of its output dependent upon where the radio processing chain is split. Using terminology meant to cover all possible processing splits, the DU may be understood as producing "processed data" for the RU, and the RU may be considered as performing corresponding radio transmissions in correspondence with the processed data output to it from the DU.

The term "radio transmissions" encompasses, but is not limited to, traditional frequency bands, e.g., 600-800 MHz, 1900 MHz, and so-called millimeter wave bands extending up to and beyond 6 GHz, e.g., 30 GHz. Similarly, the term "processed data" encompasses, unless otherwise stated, any data and/or associated control signaling that is output from a DU to an RU according to strict radio-timing requirements, with I/Q baseband waveform data comprising a non-limiting example.

In some wireless communication networks, the DU and the RU are co-located at a radio tower, which results in insignificant propagation delays between the two. In some cases, the DU is dedicated to a single RU. In other cases, a DU is located in a central office (CO) and manages one or more RUs that are remote from the DU and are positioned at associated antenna sites with various distances from the CO. The DU and each respective RU exchange data via respective fronthaul links, where the timing of those exchanges is tied strictly to the involved radio transmission timing.

An RU must perform its radio transmission and reception operations according to the timing structure defined by its "air interface." For current protocols, as well as those in development such as the Fifth Generation New Radio (5G NR) protocol, transmissions are strictly structured in various divisions of time, such as radio frames, subframes, slots, sub-slots, and symbol times. Regardless of how the involved Transmission Time Intervals (TTIs) are defined, it shall be understood that radio transmissions and receptions by the RU must be strictly aligned with or otherwise synchronized to the radio timing. Correspondingly, the data exchanges between the DU and the RU, including the ongoing or successive outputting of processed data from the DU to the RU, must be carried out in compliance with strict radio timing.

With advances in cloud computing technology, many industries are moving processing operations to virtual machines operating on host servers in large cloud processing centers. Much of this interest involves higher-level processing that is not time-sensitive, or at least not sensitive in a real-time processing sense. Thus, cloud computing is generally designed for high compute density and heavy workloads, but not for latency-sensitive workloads having strict, deterministic timing requirements. Consequently, while cloud computing offers certain attractions in terms of economies of scale, convenience, and maintenance, existing cloud implementations are ill-suited for various aspects of radio chain processing.

SUMMARY

Example methods and apparatus disclosed herein use the "processing margin" at a radio unit (RU) as a control variable for modifying the allocation of virtualized processing resources used by a digital unit (DU) that supports the RU. The DU and RU form a radio processing chain with a functional split, in which the DU performs certain processing operations and provides corresponding processed data to the RU, which performs further processing for the generation and transmission of the corresponding radio signals. The "slack" between the end of processing in the RU and the corresponding required transmission time represents the processing margin. Among other advantages, the processing-margin feedback loop allows for the virtualization of all or part the DU, e.g., in a cloud computing center, while avoiding the need for the network operator to implement or pay for over-dimensioning of the DU, as would be needed to ensure that a static allocation meets worst-case processing needs.

An example method may be performed by a computer apparatus operative as a resource management entity, e.g., a computer server or other computer node in a cloud computing arrangement that is configured to control virtualized processing resource allocations, possibly via one or more hypervisors that are local to the virtualized resources. In any case, the method includes the computer apparatus determining the processing margin at an RU that performs respective radio transmissions at specified times, in dependence on receiving respective processed data from a DU. The DU uses an allocation of virtualized processing resources to generate the processed data. For each radio transmission by the RU, the processing margin is the slack—difference in time—between completion of processing in the RU and the corresponding required transmission time. The method further includes the computer apparatus modifying, based on the processing margin, the allocation of virtualized processing resources used by the DU for generating the processed data for the RU.

In a related example, a computer apparatus is operative as a resource management entity. The computer apparatus includes communication circuitry and processing circuitry. The processing circuitry is configured to determine the processing margin at an RU that performs respective radio transmissions at specified times, in dependence on reception of respective processed data from a DU. For each radio transmission by the RU, the processing margin indicates the difference in time between the completion of processing at the RU and the corresponding required transmission time. The processing circuitry is configured to modify, based on the processing margin, an allocation of virtualized processing resources for use by the DU for generating the processed data for the RU.

In another, related implementation, a non-transitory computer-readable storage medium has stored instructions that, when executed by processing circuitry of a computer apparatus, cause the computer apparatus to perform certain operations, for functioning as a resource management entity. The operations include determining the processing margin and modifying, based on the processing margin, an allocation of virtualized processing resources used by a DU for generating processed data for an RU.

In another example, an RU implements a method that includes measuring the processing margin for performing respective radio transmissions at specified times in dependence on receiving respective processed data from a DU. For each radio transmission, the processing margin is the slack between the completion of processing at the RU and the corresponding required transmission time. The method also includes the RU transmitting an indication of the processing margin to the DU, for use in modifying an allocation of virtualized processing resources used by the DU to generate the processed data for the RU.

In a related example, an RU configured for radio transmissions includes communication circuitry and processing circuitry. The processing circuitry is configured to measure the processing margin for the performance of respective radio transmissions in dependence on receiving respective processed data from a DU. For each radio transmission, the processing margin is the slack between completion of processing in the RU and the corresponding required transmission time. The processing circuitry is also configured to transmit, via the communication circuitry, an indication of the processing margin to the DU, for use in modifying an allocation of virtualized processing resources used by the DU to generate the processed data for the RU.

In a corresponding embodiment or implementation, a non-transitory computer-readable storage medium contains stored program instructions that, when executed by processing circuitry of an RU, cause the RU to perform certain operations. The operations include measuring the processing margin and transmitting an indication of the processing margin to the DU, for use in modifying an allocation of virtualized processing resources used by the DU to generate the processed data for the RU.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 5 is a logic flow diagram of an embodiment of a method of operation at a resource management entity.

FIG. 6 is a logic flow diagram of an embodiment of a method of operation at an RU.

DETAILED DESCRIPTION

This disclosure describes methods and apparatus for managing an allocation of virtualized processing resources to a digital unit (DU) that supports a radio unit (RU) configured to perform radio transmissions, e.g., where the DU and the RU form part of a wireless communication network and the DU is implemented at least in part via virtualized processing resources. Particularly, a resource management entity or other functional entity at cloud computing center or other virtualized computing environment modifies an allocation of virtualized processing resources used by the DU to support the RU, in dependence on the "processing margin" at the RU.

The radio chain processing collectively provided by the DU and the RU must meet strict radio timing requirements. For example, to perform a transmission, the DU performs certain processing operations and output corresponding "processed data" to the RU, which then applies certain additional processing, for the generation and transmission of the corresponding radio signal(s). The respective processing operations performed by the DU and the RU depends on the how the radio chain processing responsibilities are "split" between the DU and the RU. Regardless, with respect to performing a radio transmission according to a required transmission time, the requisite DU and RU operations necessarily must be completed in advance of the transmission time. Processing time at the DU, propagation time between the DU and the RU, and processing time at the RU all consume portions of the overall processing "window" in advance of the required transmission time, and the "processing margin" at the RU for a given transmission event is the "slack" or remaining time between the completion of processing at the RU and the corresponding transmission time, which may be a deadline or which may be a specifically-targeted time.

Virtualizing the DU offers certain advantages but the processing load on the DU for supporting an RU depends on several variables, such as the number of wireless devices being served over the air interface provided by the RU, and the types of communication services being provided to such devices. Using the processing margin at the RU as a control variable for dynamically adjusting the virtualized resource allocation to a DU allows the processing capacity of the DU to shrink or grow—e.g., within lower and/or upper bounds—according to the prevailing need. In turn, the dynamic adjustments in processing capacity obviate the need for making a conservative, static allocation of virtualized processing resources that otherwise would be needed for the DU, to ensure that the DU has enough processing capacity to support the RU in a worst-case scenario. Here, "capacity" does not necessarily refer to computing capacity and may refer to essentially any resource-based expression of capacity, such as virtualized memory capacity, etc.

Figures 1A, 1B:
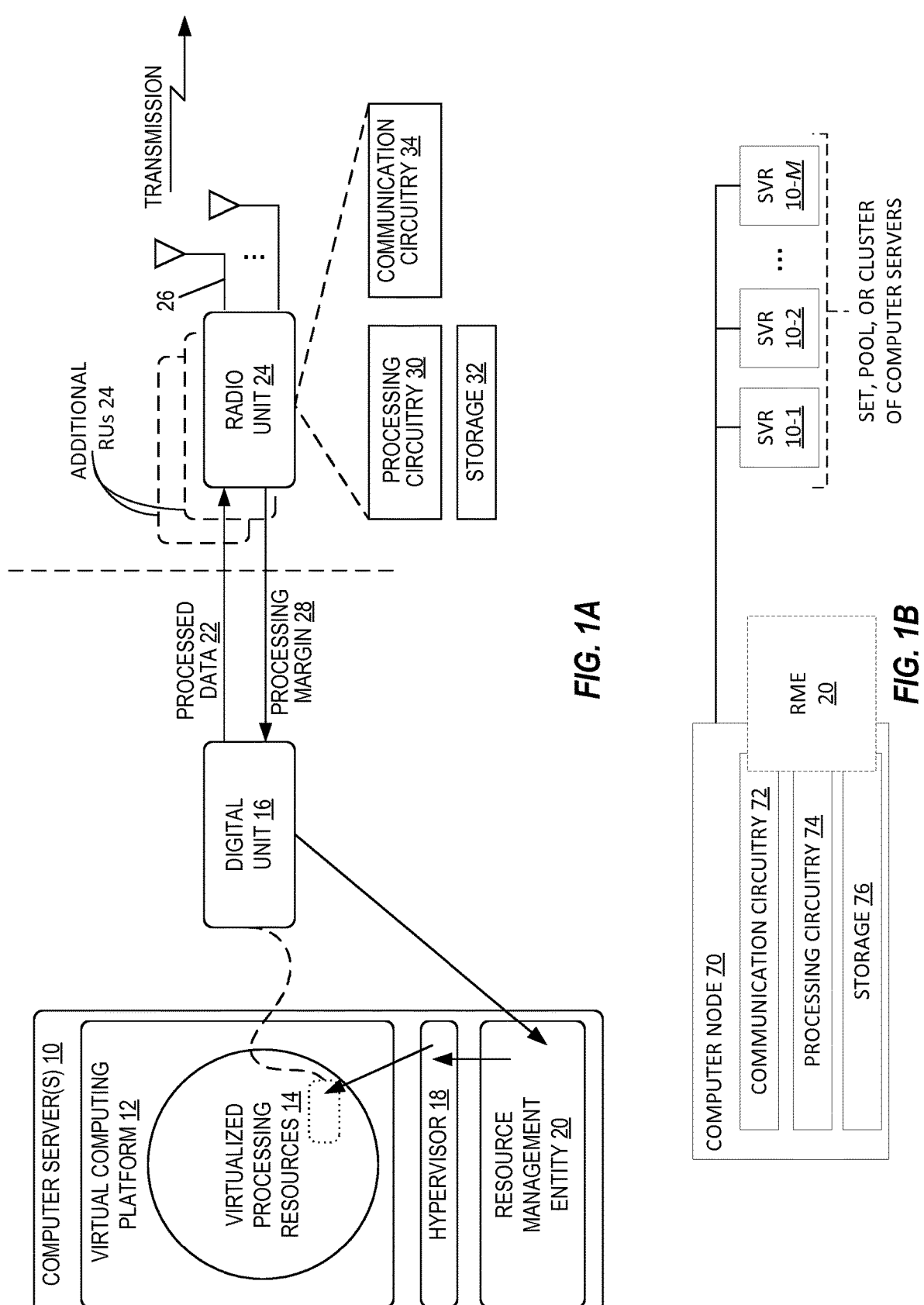
FIG. 1A is a block diagram of example embodiments one or more computer servers, a digital unit (DU) that is implemented at least in part using virtualized processing resources managed by the computer server(s), and one or more radio units (RUs) supported by the DU.
FIG. 1B is a block diagram of another embodiment of implementing a resource management entity.

FIG. 1A illustrates one or more computer servers 10 that implement a virtual computing platform 12 having virtualized processing resources 14. A DU 16 is instantiated—at least in part—on the virtualized processing resources 14. "Instantiated" in this context means that some or all of the processing functionality of the DU 16 is realized via an allocation of virtualized processing resources. In an example embodiment, the computer server(s) 10 implement one or more hypervisors 18 and a resource management entity 20.

A hypervisor 18, for example, manages the virtualized computing environment on a corresponding computer server 10, and the resource management entity 20 effectuates changes in the allocation of virtualized processing resources 14 for one or more DUs 16, based on communicating with the involved hypervisors 18. That is, while FIG. 1A illustrates on DU 16, the virtual computing platform 12 may include two or more DUs 16, implemented using respective allocations of the virtualized processing resources 14. Further, each DU 16 may support one RU 24, or more than one RU 24. When a DU 16 supports multiple RUs 24, controlling the allocation of virtualized processing resources 14 to the DU 16 may be performed with respect to each supported RU 24, e.g., dynamically controlling a sub-allocation of virtualized processing resources 14 for the DU 16, with respect to the needs—radio chain processing load—associated with each DU 16. Or, an overall allocation of virtualized processing resources 14 for the DU 16 may be managed dynamically, as a function of the aggregate needs of the supported RUs 24.

While FIG. 1A depicts the resource management entity 20 as being realized in one or more of the computer servers 10 that provide the virtualized computing platform, the depiction corresponds to a non-limiting example. In one or more other embodiments, a computer node or other computer apparatus separate from the computer servers 10 implements the resource management entity 20.

FIG. 1B illustrates another example embodiment of the resource management entity 20. Rather than implementing the resource management entity 20 on one or more of the computer servers 10 used to provide the virtualized processing resources 14, the arrangement in FIG. 1B involves a separate computer node 70 that is operative as the resource management entity 20—abbreviated as "RME 20" in the diagram. The computer node 70 includes communication circuitry 72, such as circuitry configured for Ethernet-based communications or other computer-networking protocols, along with processing circuitry 74 that is configured for implementation of the resource-management-entity functionality, e.g., based at least in part on the execution of stored computer program instructions.

A set, pool, cluster, or other grouping of computer servers 10, shown as 10-1, 10-2, . . . , 10-M, provide the virtualized processing resources 14. In one example, a hypervisor 18 manages the virtualization environment of each computer server 10 and the resource management entity 20 manages the hypervisors 18, for controlling the allocation of virtualized processing resources 14 provided for the virtualization of one or more digital units 16. One approach to scaling the foregoing arrangement provides a resource management entity 20 per cluster of computer servers 10, such that a given cloud computing site may include multiple resource management entities 20, each responsible for a corresponding subset of computer servers 10.

Because of the flexibility for implementation of the resource management entity 20, this disclosure refers to its implementation on a "computing apparatus", where, by way of example, the computing apparatus may be one of the computer servers 10 in a group or cluster that provides the virtualized computing platform 12 of interest or may be a computer node 70 separate from any of the involved computer servers 10.

The example DU 16 operates, at least in part, as a virtual machine (VM) or one or more virtual network functions (VNFs) to generate and then transmit processed data 22 to an RU 24, for performing a corresponding radio transmission. The DU 16 includes or is associated with physical interface circuitry that communicatively couples the DU 16 to the RU 24 over some medium, such as a fiber-optic link, an Ethernet connection, etc. For example, the DU 16 and the RU 24 communicate over a fiber optic link according to the Common Public Radio Interface (CPRI).

In a non-limiting example, the processed data 22 includes digital waveform data for use by the RU 24 in generating corresponding analog radio signals for transmission via one or more radio antennas 26. User traffic or other data for Over-the-Air (OTA) transmission by the RU 24 arrives at the DU 16, e.g., from a core node in the involved wireless communication network, and the DU 16 generates the corresponding digital waveform data, e.g., baseband waveform data, for transmission to the RU 24 as processed data 22. The RU 24, as noted, performs radio transmissions in dependence on the processed data 22. The nature and content of the processed data 22, in turn, depend on how the radio processing chain is split between the DU 16 and the RU 24.

The term "processed data 22" may refer to data that is processed and transmitted to the RU 24 in an ongoing or repeating process, e.g., different processed data 22 output in or with respect to each in a succession of Transmission Time Intervals (TTIs) or other intervals defined by the radio timing applicable to radio transmissions and receptions by the RU 24. The RU 24 uses the processed data 22 received for a respective transmission interval to perform over the air (OTA) transmission via one or more radio antennas 26, which may comprise an antenna array used for transmit beamforming. The RU 24 measures a processing margin 28.

As noted, the processing margin 28 at the RU 24 for a given radio transmission is the slack between the completion of processing at the RU 24 and the corresponding required transmission time, which may be a deadline. The processing margin 28 is expressed, for example, in units of time. Alternatively, the processing margin 28 may be expressed as a quantized or logical value, such as "low", "medium", and "high", with low indicating that the slack is below a first defined threshold, medium indicating that the slack is at or above the first defined threshold but below a second defined threshold, and high indicating that the slack is at or above the second defined threshold. In another example, the processing margin 28 is indicated as a binary value, such as a three-bit value that quantizes the slack, as measured by the RU 24, into eight ranges. Regardless of how it is expressed, the processing margin 28 provides a mechanism for determining whether, for a given radio transmission, the DU 16 provided the processed data 22 to the RU 24 at the "right" time, or too early or too late.

Providing the processed data 22 from the DU 16 to the RU 24 too late means that there was too little time between the completion of processing at the RU 24 and the required transmission time, thus risking a radio timing violation. Providing the processed data 22 too early means that there was excess time between the completion of processing at the RU 24 and the required transmission time, suggesting that the DU 16 has more processing capacity than it needs for prevailing conditions. Providing the processed data 22 at the "right" time means that the processing margin 28 at the RU 24 hits a targeted value or falls within a targeted range.

In an example embodiment, the RU 24 is configured for radio transmissions and includes communication circuitry 34 and processing circuitry 30. The processing circuitry 30 is configured to measure a processing margin 28 for the performance of respective radio transmissions at specified times, in dependence on receiving respective processed data 22 from the DU 16. For each radio transmission, the processing margin 28 indicates the slack between completion of processing at the RU 24 and the corresponding radio transmission deadline.

That is, for a given transmission event, the processing margin 28 comprises the time difference between the completion of processing at the RU 24 and the corresponding required time for performing the radio transmission. Here, the required time may be transmission deadline by which the transmission must be performed, or it may be a specific time for performing the transmission, such as may be dictated by the radio timing structure of the air interface supported by the RU 24.

In any case, the processing circuitry 30 is configured to transmit, via the communication circuitry 34, an indication of the processing margin 28 to the DU 16, for use in a modification of an allocation of the virtualized processing resources 14 used by the DU 16 to generate the processed data 22. The processing circuitry 30 may transmit a new or updated indication of the processing margin 28, for each measurement of the processing margin 28 at the RU 24.

The processing circuitry 30 comprises, in one or more embodiments, one or more microprocessors, Digital Signal Processors (DSPs), Field Programmable Gate Arrays (FPGAs), Application Specific Integrated Circuits (ASICS), or other digital processing circuitry. In at least one such embodiment, the processing circuitry 30 is configured according to the teachings herein based on the execution of a computer program product or other computer program instructions contained in storage 32, which is included in or associated with the processing circuitry 30. The storage 32 may further hold one or more items such as timing control data that indicates a deadline for reception of respective processed data 22, arrival times of the respective processed data 22, or a difference between the two.

The storage 32, for example, comprises one or more types of computer-readable media, such as a mix of non-volatile memory circuits or disk storage and volatile, working memory. Non-limiting examples of non-volatile storage include Solid State Disk (SSD) storage, FLASH, and EEPROM, while non-limiting examples of the volatile, working memory include DRAM or SRAM.

The communication circuitry 34 may support communication with the DU 16 according to one or more defined protocols, such as CPRI or an Ethernet-based protocol. In addition to providing a communication interface to the DU 16, the communication circuitry 34 may further include radio transmission circuitry and radio reception circuitry. Examples of analog radio circuitry that may be contained in the communication circuitry 34 include modulators, filters, power amplifiers, etc., in a radio transmission signal chain, and low-noise amplifiers, filters, downconverters, demodulators, etc., in a radio reception signal chain.

In at least one embodiment, the radio-related portion of the communication circuitry 34 performs or supports transmit and/or receive beamforming via the antenna(s) 26. Beamforming-related processing may be performed at the RU 24, based on operating on the processed data 22 incoming from the DU 16, or the DU 16 may perform at least some portion of the beamforming processing, with the results reflected in the processed data 22.

For a given respective radio transmission, the deadline for receiving the processed data 22 at the RU 24 comprises a time deadline in advance of a time specified for transmission of the respective radio transmission by which the RU 24 must receive the respective processed data 22 from the DU 16. The required reception time accounts for, for example, the time needed at the RU 24 to operate on the processed data 22, or to otherwise ready itself for performing a radio transmission corresponding to the processed data 22. The processed data 22, as noted, may comprise digital waveform data for use by the RU 24 in generating corresponding analog radio signals for transmission via one or more radio antennas 26.

In at least one embodiment of the RU 24, the RU 24 includes storage 32 that stores a computer program that, when executed by the processing circuitry 30 of the RU 24, cause the RU 24 to measure a processing margin 28 for performance of respective radio transmissions at specified times, in dependence on receiving respective processed data 22 from a DU 16. For each radio transmission, the processing margin 28 indicates the slack between the completion of processing at the RU 24 and the corresponding required transmission time. Execution of the stored computer program instructions further causes the RU 24 to transmit an indication of the processing margin 28 to the DU 16, for use in modifying an allocation of virtualized processing resources 14 used by the DU 16 to generate the processed data 22. In particular, providing the processing margin 28 to the DU 16 allows the resource management entity 20 to determine the processing margin 28, based on obtaining it from the DU 16 directly or indirectly through the associated hypervisor 18.

The above RU-based processing may be done for successive TTIs or other defined intervals, such that a processing margin 28 is measured and reported by the RU 24 with respect to each interval, in dependence on the reception time of the respective processed data 22 from the DU 16 for the interval. Thus, the RU 24 may send successively-measured values of the processing margin 28, corresponding to successive TTIs. In turn, the DU 16 may report the successive values of the processing margin 28 to the resource management entity 20, or otherwise make them available for retrieval by the resource management entity 20, either directly from the DU 16 or indirectly through the associated hypervisor 18. In either case, the resource management entity 20 determines the processing margin 28 for a given radio transmission by an RU 24, based on the RU 24 measuring the processing margin 28 for the radio transmission, reporting the processing margin 28 to the DU 16, and further based on the resource management entity 20 receiving or retrieving the processing margin 28 from the DU 16.

In at least one example, the respective radio transmissions by the RU 24 are transmissions on a carrier signal having a defined radio timing structure and the specified times are dictated by the defined radio timing structure of the carrier signal. In an example implementation, the timing structure includes division of time into radio frames, subframes, slots, and symbol times. The processed data 22 that is "respective" to a given time interval comprises data generated by the DU 16 for that time interval.

Figure 2:
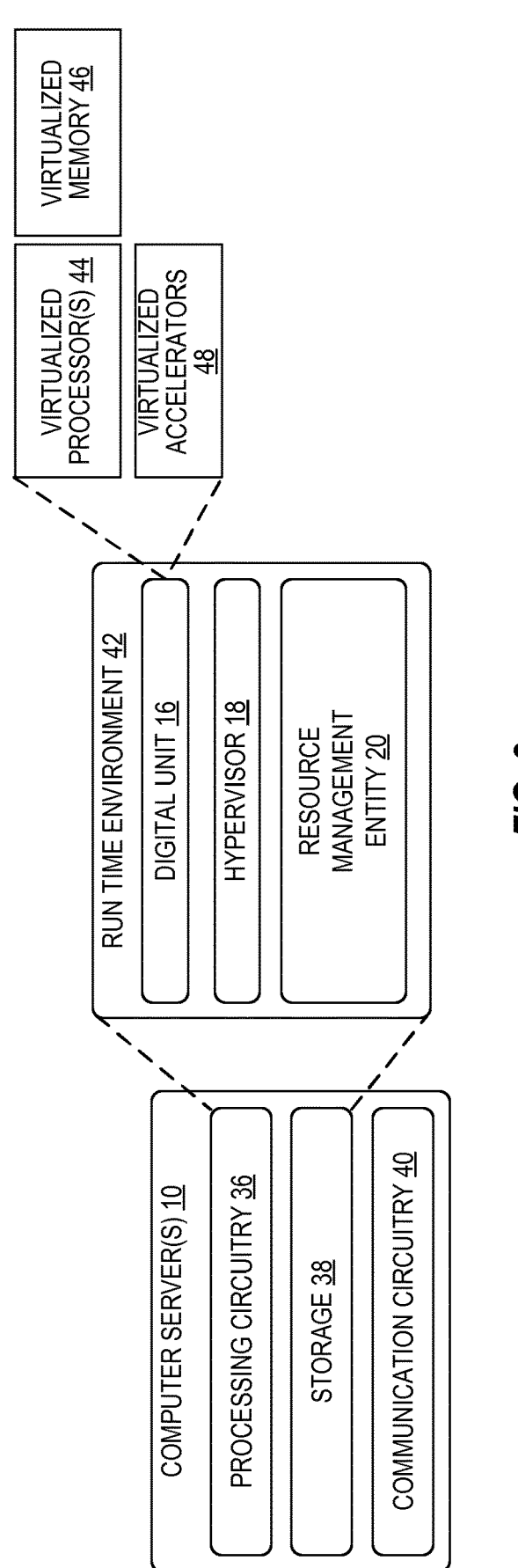
FIG. 2 is a block diagram of example implementation details for the computer server(s) introduced in FIG. 1A.

FIG. 2 illustrates an example implementation of one or more computer servers 10 that is/are operative as a resource management entity 20. The one or more computer servers 10 comprise processing circuitry 36, storage 38, and communication circuitry 40. The processing circuitry 36 and storage 38 cooperate to provide a runtime environment 42 in which the resource management entity 20 may be functionally realized, along with one or more hypervisors 18. Here, it may be appreciated that the resource management entity 20 manages one or more hypervisors 18, with each respective hypervisor 18 managing virtualization on a corresponding computer server 10. It should also be appreciated that the resource management entity 20 may communicate with multiple computer servers 10, each running its own hypervisor 18, with each hypervisor 18 managing virtualized processing resources instantiated on its local computer server 10.

Thus, the virtualized processing resources 14 shown in FIG. 1A may "reside" in a different computer server 10 or servers 10 than the one that "hosts" the resource management entity 20, or they may be realized in whole or in part on the same computer server(s) 10 that host the resource management entity 20. Further, in at least one embodiment, the resource management entity 20 is implemented in distributed fashion across two or more computer servers 10, each with its own hypervisor 18 and corresponding virtualized processing resources 14.

The example runtime environment 42 in the diagram provides for the instantiation or realization of the resource management entity 20 and at least one hypervisor 18, and it may also provide for the instantiation of all or some of the virtualized processing resources 14 used by a DU 16. Alternatively, the virtualized processing resources 14 used to implement the DU 16 are realized at one or more other computer servers 10. In any case, the resource management entity 20 controls an allocation of virtualized processing resources 14 for the DU 16.

Here, "allocation" implies a controllable assignment or dedication of a portion of the virtualized processing resources 14, which may comprise one or more virtualized processors 44, or fractions of a virtualized processor 44. Additionally, or alternatively, the allocation of virtualized processing resources 14 comprises an amount or portion of available virtualized memory 46 and/or the allocation of virtualized accelerators 48. The virtualized accelerators 48 include or are tied to one or more FPGAs or other hardware-based acceleration devices that provide certain specialized processing. Other examples of virtualized accelerators include Graphical Processing Units (GPUs), Digital Signal Processors (DSPs) or DSP cores, multi-core processors, or other types of "co-processors" that provide accelerated processing at least for certain types of operations or computations.

Of course, computer processing hardware and the realization of virtualized processing environments for the implementation of virtual machines and/or virtual network functions (VNFs) used to implement one or more DUs 16 is subject to significant variation and the illustrated embodiment must be understood as a nonlimiting example. In that context, the processing circuitry 36 is configured to determine a processing margin 28 associated with an RU 24 that performs respective radio transmissions at specified times in dependence on reception of respective processed data 22 from the DU 16. For each radio transmission by the RU 24, the processing margin 28 indicates a difference in time between the completion of processing at the RU 24 and the corresponding required transmission time.

In at least one embodiment, the processing circuitry 36 is configured to determine the processing margin 28 as between a DU 16 and a corresponding RU 24, based on receiving an indication of the processing margin 28 from the DU 16, as measured and reported by the RU (24). Here, it will be understood that processing circuitry 36 may determine the processing margin 28 as between a given DU 16 and an associated RU 24 on an ongoing or repeating basis, in relation to a plurality of radio transmissions. For example, a succession of radio transmissions occurs in a corresponding succession of transmission time intervals and the processing circuitry 36 obtains an updated processing margin 28 from the DU 16, for each transmission time interval (TTI) in the succession of transmission time intervals.

Actions or control decisions taken by the processing circuitry 36 with respect to the processing margin 28 may be based on the most recent value of the processing margin 28, a running window of the last N determined values of the processing margin 28, where N is an integer greater than one, or based on some other averaging or filtering. The modifications to the allocation of virtualized processing resources 14 to the involved DU 16 may, therefore, be performed at the rate at which new values of the processing margin 28 are determined or reported, e.g., per the applicable transmission time interval, or may be performed at a slower rate. In cases where allocation control decisions are based on averaging the last N values for the processing margin 28 at a given RU 24, the processing circuitry 36 may respond to individual values of the processing margin 28, such as when the resource management entity 20 receives an indication of a processing margin 28 that is below a critical low threshold.

Regardless of how the processing circuitry 36 determines the processing margin 28 at a given RU 24 associated with a given DU 16, the processing circuitry 36 is configured to modify, based on the processing margin 28, an allocation of virtualized processing resources 14 for use by the given DU 16, for generating processed data 22 for the given RU 24. One DU 16 may support multiple RUs 24. Each RU 24 generates and reports respective processing margins 28. Correspondingly, the resource management entity 20 manages respective allocations of virtualized processing resources 14 for support of the respective RUs 24. In one example of such an arrangement, the VNF or VNFs by which the DU functionality is implemented with respect to each RU 24 is/are realized via respective modifiable allocations of virtualized processing resources 14.

These VNFs may be implemented on a single host computer server 10 or may be distributed between or among two or more computer servers 10. Regardless, with respect to modifying the allocation of virtualized processing resources 14 that are "contained" or managed within a particular computer server 10, the processing circuitry 36 in one or more embodiments is configured to communicate with the hypervisor 18 that is responsible for the involved virtualized processing resources 14. In at least one embodiment, the processing circuitry 36 is configured to modify the allocation of virtualized processing resources 14 by transmission of an instruction to the hypervisor 18, via the communication circuitry 40. In turn, the hypervisor 18 is configured to modify an allocation of at least one of a virtual processing core, a virtual memory, or other virtualized resources, such as may be tied to FPGA resources or other specialized hardware-based accelerators included in the computer server 10 for which the hypervisor 18 responsible. In addition to the FPGA-based example, other examples of hardware-based accelerators include GPUs, DSPs or DSP cores, multi-core processors, or other types of co-processors that provide accelerated processing at least for certain types of operations or computations.

In one or more embodiments, the processing circuitry 36 is configured to modify an allocation of virtualized processing resources 14 used by a DU 16 by at least one of: increasing, based on an applicable processing margin 28 being below a first processing margin threshold, the allocation of the virtualized processing resources 14 to the DU 16; and decreasing, based on the applicable processing margin 28 being above a second processing margin threshold, the allocation of the virtualized processing resources 14 to the DU 16. Here, "applicable processing margin 28" refers to the processing margin 28 being evaluated and it is the processing margin at one of the one or more RUs 24 supported by the DU 16.

As noted, with respect to a given DU 16 and an RU 24 supported by the DU 16, the respective radio transmissions for which the RU 24 measures respective processing margins 28 may comprise a plurality of radio transmissions— i.e., strictly-timed, successive transmissions. Thus, in one or more embodiments, the processing circuitry 36 is configured to perform the determination of the processing margin 28 and the modification of the allocation of virtualized processing resources 14 on a repeating basis, in relation to the plurality of radio transmissions.

The storage 38 in at least one embodiment comprises one or more types of computer-readable media, such as volatile, working memory, non-volatile memory for program storage, or some mix thereof. Non-limiting examples include DRAM, SRAM, FLASH, EEPROM, Solid State Disk (SSD), and hard disk storage. In at least one such embodiment, the storage 38 stores one or more computer programs comprising computer program instructions that, when executed by the processing circuitry 36, cause the involved computer server 10 to determine a processing margin 28 associated with a RU 24 that performs respective radio transmissions at specified times in dependence on reception of respective processed data 22 from a DU 16.

For each radio transmission by the RU 24, the processing margin 28 indicates a difference in time between the completion of processing at the RU 24 and the corresponding required transmission time. Correspondingly, the one or more computer programs include computer program instructions further causing the computer server 10 to modify, based on the processing margin 28, an allocation of virtualized processing resources 14 used by the DU 16 for generating the processed data 22 for the RU 24.

Figure 3:
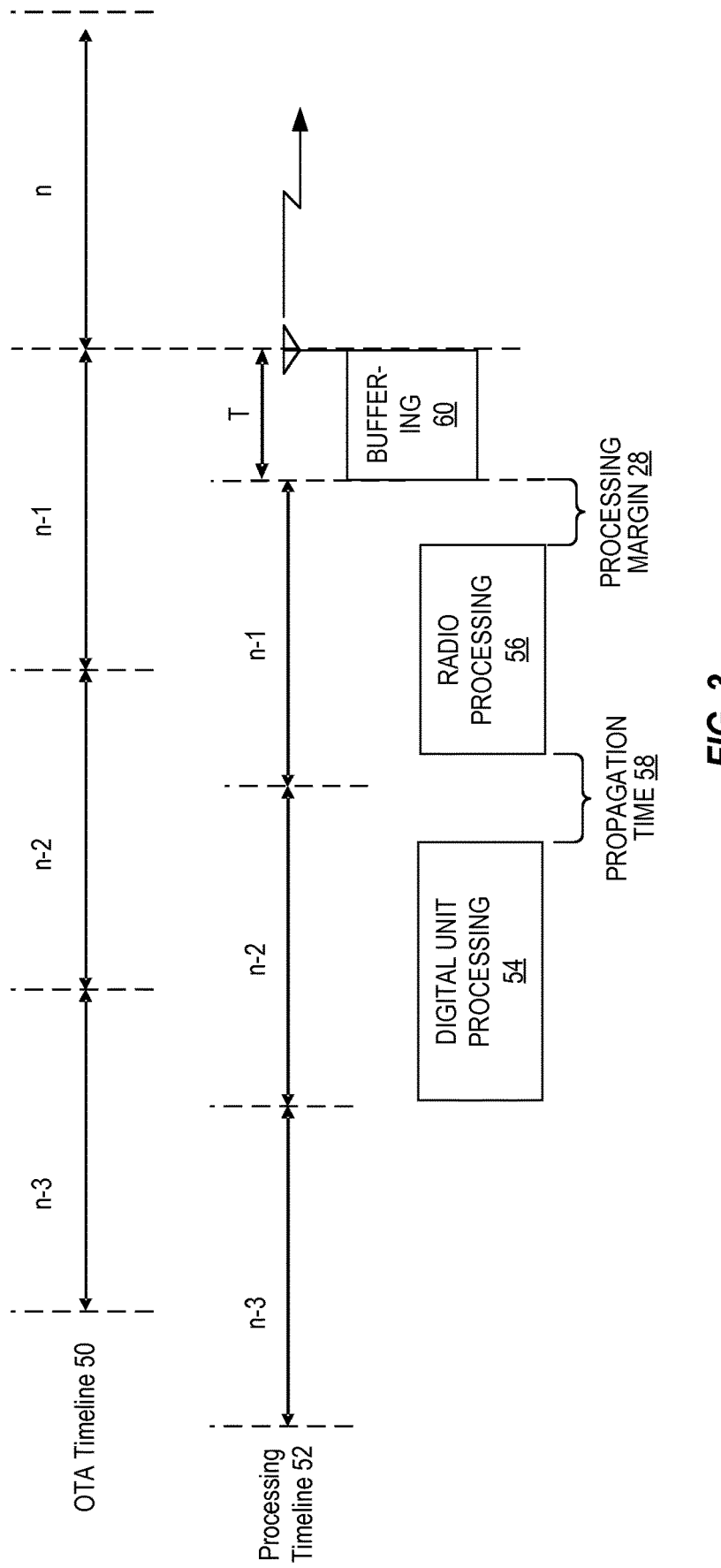
FIG. 3 is a diagram illustrating an over the air (OTA) timeline and a corresponding processing timeline for radio transmissions in a wireless communication network, such as may be performed by the RU(s) of FIG. 1A.

FIG. 3 is a diagram illustrating an OTA timeline 50 and a processing timeline 52 for wireless transmissions by an RU

24, such as an RU 24 operating in a Radio Access Network (RAN) of a wireless communication network that relies on one or more DUs 16 that are virtualized. The illustrated scenario assumes that the DU 16 receives user traffic or other data, e.g., incoming from a core network node of the wireless communication network, for transmission by an RU 24 in the nth interval on the OTA timeline 50. In the example, such data is received at the DU 16 at the beginning of the n-2 interval, and it takes a finite amount of time to produce the corresponding processed data 22. The diagram illustrates the radio processing time taken by the DU 16 as "DIGITAL UNIT PROCESSING 54".

The processing time 54 at the DU 16 may depend on several factors, but of interest herein, it depends on the current allocation of virtualized processing resources 14 that are used by the DU 16 to generate the process data 22. The DU 16 transmits the processed data 22 to the RU 24, with that transmission involving a certain propagation time 58. The propagation time 58 varies, for example, as a function of the distance between the DU 16 and the RU 24.

With the illustrated delays or elapsed times 54 and 58, the RU 24 receives the processed data 22 at a certain point within the n-1 interval. The RU 24 further processes the processed data 22 to generate the radio data—radio signal information—for transmission. The time needed by the RU 24 for performing its portion of the radio chain processing appears in the diagram as "RADIO PROCESSING 56". Ignoring for the moment any additional time needed for signal buffering, the time difference between the completion of processing at the RU 24 and the required transmission time is the processing margin 28. Of course, it is also contemplated to include any required buffering time— shown as BUFFERING 60 in the diagram—in the processing margin 28. Indeed, the reference points for measuring the processing margin 28 margin at the RU 24 may be varied, so long as the resulting measurement provides a reliable, consistent indication of the slack between the time at which the RU 24 is ready for transmission or has completed the processing needed for transmission and the corresponding required transmission time.

As noted earlier, the split in the radio chain processing aggregately represented by the DU 16 and the RU 24 dictates the amount and nature of processing needed in the DU and the RU 24, and FIG. 3 stands as a non-limiting example. The interesting point to take from FIG. 3, is that feeding back the processing margin 28 effectively provides a mechanism for "closing a control loop" in dependence on the strict radio timing associated with the operation of the DU 16 and the RU 24. Thus, the resource management entity 20 may be viewed as being "RAN aware", which connotes the fact that the resource management entity 20 manages virtualized resource allocations for the DU 16, to ensure that the involved processing of the DU 16 provides for compliance with the strict radio timing requirements.

Another point to appreciate is that a given DU 16 may support more than one RU 24, potentially with substantially different propagation delays between the DU 16 and each of the RUs 24. Further, the network or radio loading associated with each RU 24 may vary significantly—one RU 24 may serve more wireless devices than another RU 24, or one RU 24 may be involved in supporting higher rate communication services than another RU 24. As such, the DU 16 may have more time or less time to generate processed data 22 for one of its supported RUs 24 than for another one of its supported RUs 24. Providing ongoing feedback of the processing margin 28 experienced at each of the RUs 24 allows for the individualized management of respective allocations of virtualized processing resources 14 used by the DU 16 for each of the respective are RUs 24.

The foregoing discussion of functionality regarding the resource management entity 20 involving the example processing arrangement of FIG. 2 is non-limiting. For example, regarding the computer node 70 of FIG. 1B, the communication circuitry 72, the processing circuitry 74, and the storage 76 may, with respect to implementing the resource-management-entity functionality described herein, be arranged or configured as described for the communication circuitry 40, processing circuitry 36, and storage 38.

Figure 4:
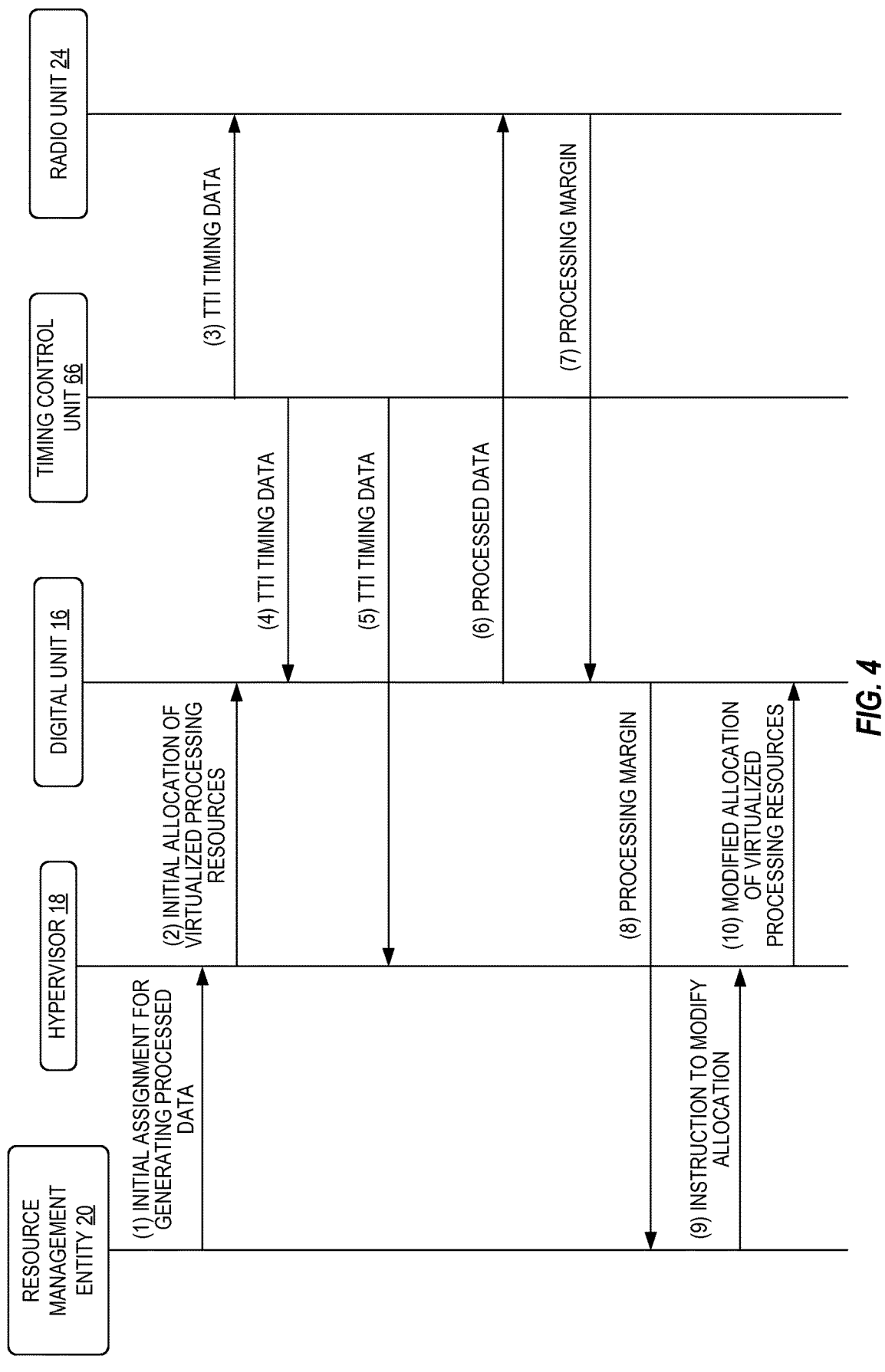
FIG. 4 is a signal flow diagram in one embodiment of signaling between an RU, a DU, and a resource management entity.

FIG. 4 is a signal flow diagram showing transmissions between respective nodes, including a resource management entity 20, a hypervisor 18, a DU 16, an RU 24, and a timing control unit 66 included in or associated with the RU 24. The resource management entity 20 transmits (Step 1) an assignment 68 to the hypervisor 18, to establish an initial or default allocation of virtualized processing resources 14 for a DU 16 that is virtualized on the computer server 10 that hosts hypervisor 18. The hypervisor 18 is, in at least some embodiments, the entity that establishes, controls, and modifies the allocation for the DU 16, but it does so under control or supervision of the resource management entity 20, which has knowledge of the applicable processing margin information.

The hypervisor 18 correspondingly makes the initial allocation of virtualized processing resources 14 for the DU 16 (Step 2). The timing control unit 66 transmits transmission time interval (TTI) timing data (Steps 3, 4, and 5) to synchronize the DU 16 and RU 24 for communication in the wireless network. The hypervisor 18 may also receive the TTI timing data directly from the timing control unit 66 or via the DU 16, and advantageously use that information to schedule resource allocations or otherwise schedule execution of the VNFs used to implement the DU functionality. In this context, the DU 16 and the RU 24 may be considered as comprising a wireless communication network, or as belonging to a wireless communication network. However, the cloud computing center or other facility containing the computer server(s) 10 may or may not be a "dedicated" part of the wireless communication network In any case, the DU 16 transmits the processed data 22 to the RU 24 for an OTA transmission within the involved wireless communication network (Step 6). The RU 24 the processing margin 28, which can indicate whether the processed data 22 is late, nearly late, sufficiently early, or unnecessarily early for meeting the deadline for OTA transmission by an antenna 26 of the RU 24. In this respect, the processing margin 28 may be a quantized value, such as an index or pointer to a ranged value, or may be a continuous value, such as a floating-point representation of the margin. In any case, the RU 24 reports the processing margin 28 back to the DU 16 (Step 7).

The DU 16 provides the processing margin 28 to the resource management entity 20 (Step 8) or, equivalently, the resource management entity 20 receives it from the involved hypervisor 18. The resource management entity 20 modifies the allocation of virtualized processing resources 14 for the DU 16 in dependence on the processing margin 28—e.g., it may increase or decrease the allocation, or leave the allocation unchanged, in dependence on the processing margin 28. The resource management entity 20 sends an instruction or other signaling to the involved hypervisor 18, to effectuate any decided modification, or to indicate that the current allocation shall be maintained (Step 10). In other implementations, the resource management entity 20 does not send allocation instructions to the hypervisor 18, unless there is a need to modify the current allocation.

In addition to managing the allocation of virtualized computing resources to the DU 16, the resource management entity 20 and/or the hypervisor 18 may use the TTI timing data and/or the processing margin 28 as control variables for determining the scheduling of processing jobs or other tasks within the virtualized processing environment. For example, the scheduling of processing jobs—which may be done via the activation or execution of VNFs—that correspond to real-time operations associated with radio transmission or reception may be given strict schedule-by times or otherwise may be prioritized.

As one example, the hypervisor 18 may schedule virtual processing resources for timely completion of a workload within the involved host computer server 10. In examples of computer server(s) 10 executing a Linux-based operating system, the hypervisor 18 may correspond to a scheduler in a kernel-based virtual machine (KVM), which uses a standard Linux Completely Fair Scheduler (CFS) that distributes the workload on a collection of virtualized processing resources 14 in a proportional way. The hypervisor 18 could, for example, be implemented using a Linux scheduler that is configured dynamically with deadlines that reflect processing demands for one or more connected RUs 24. Such a system is not limited to scheduling of virtual machines but also works for containers (e.g., Docker, LXD, etc.) and serverless systems. The example scheduler implements a task scheduler, such as an earliest deadline first scheduler (EDF), which allow tasks to be scheduled according to the respective deadline(s). The hypervisor 18 uses, in one or more embodiments, the processing margin 28 to set deadlines for task scheduling.

FIG. 5 is a logic flow diagram of an embodiment of a method of operation at a computer apparatus 10 or 70 operative as a resource management entity 20. It should be understood that the method 500 may be performed on an ongoing basis, or otherwise be repeated, and may be included as part of other, ongoing operations. Further, the method 500 may be implemented in whole or in part based on the execution of stored computer program instructions by the processing circuitry 36 of the involved computer server(s) 10.

The example method 500 includes determining (block 502) a processing margin 28 associated with an RU 24 that performs respective radio transmissions at specified times, in dependence on receiving respective processed data 22 from a DU 16. In at least one example, the processing margin 28 indicates a difference in time between the completion of processing at the RU 24 and the corresponding required transmission time. At the resource management entity 20, the step or operation of "determining" the processing margin 28 comprises, for example, receiving it from the DU 16, where the DU 16 indicates the processing margin 28 directly to the resource management entity 20, or indicates indirectly, via the involved hypervisor 18.

The method 500 further includes modifying (block 504), based on the processing margin 28, an allocation of virtualized processing resources 14 used by the DU 16 for generating the processed data 22 for the RU 24. Modifying the allocation of virtualized processing resources 14 includes, in some implementations, sending an instruction to the involved hypervisor 18. In a corresponding example embodiment of the hypervisor 18, the hypervisor 18 is configured to modify the allocation of virtualized processing resources 14 by modifying an allocation of at least one of a virtual processing core, a virtual memory, or virtualized resources associated with one or more FPGAs or other hardware-based accelerators.

Modifying the allocation comprises, for example, increasing the allocation of virtualized processing resources 14 to the DU 16, responsive to the processing margin 28 being below a defined threshold—e.g., a low-margin or critical threshold. In another example, modifying comprises decreasing the allocation, responsive to the processing margin 28 being above another defined threshold—e.g., a high-margin threshold indicating ample processing-time slack. The resource management entity 20 may also apply hysteresis to any such margin, to avoid ping-ponging between allocation increases and allocation reductions or may other impose a minimum delay for further modifications, upon making a modification.

In at least one implementation, the respective radio transmissions comprise a plurality of radio transmissions and the method 500 comprises performing the steps of determining 502 and modifying 504 on a repeating basis, in relation to the plurality of radio transmissions. The respective radio transmissions comprise, for example, a plurality of radio transmissions and the method 500 includes performing the steps of determining (Block 502) and modifying (Block 504) on a repeating basis, in relation to the plurality of radio transmissions. In this way, the allocation is dynamically updated to reflect a current or recent demand. Broadly, then, the method 500 may be repeated on a time interval. Alternatively, or additionally, the method 500 is triggered by an event, such as a determination at the RU 24 that the processing margin 28 is above an upper threshold or below a lower threshold. The processing margin 28 being above the upper threshold indicates an over-allocation of virtualized processing resources 14 at the supporting DU 16, with respect to the RU 24. Conversely, the processing margin 28 being below the lower threshold indicates a critical risk of violating radio timing requirements, or at least indicates the need to increase the allocation to avoid such risk.

FIG. 6 is a logic flow diagram of an embodiment of a method of operation at an RU 24, such as the RU 24 introduced in FIG. 1A. It should be understood that the method 600 may be performed on an ongoing basis, or otherwise be repeated, and may be included as part of other, ongoing operations carried out by the RU 24. Further, the method 600 may be implemented in whole or in part based on the execution of stored computer program instructions by the processing circuitry 30 of the RU 24.

The method 600 includes measuring (block 602) a processing margin 28 for performing respective radio transmissions at specified times in dependence on receiving respective processed data 22 from a DU 16. For each radio transmission, the processing margin 28 indicates a difference in time between receiving the respective processed data 22 from the DU 16 and a deadline for receiving the respective processed data 22 from the DU 16. The processed data 22 includes, in one or more embodiments, digital waveform data for use by the RU 24 in generating corresponding analog radio signals for transmission via one or more radio antennas 26.

The method 600 further includes the RU 24 transmitting (block 604) an indication of the processing margin 28 to the DU 16 for use in modifying an allocation of virtualized processing resources 14 used by the DU 16 to generate the processed data 22 for the RU 24. In at least one implementation, the respective radio transmissions comprise a plurality of radio transmissions and the method 600 comprises performing the steps of measuring 602 and transmitting 604 on a repeating basis, in relation to the plurality of radio transmissions.

As such, the allocation of virtual processing resources 14 used by the DU 16 for generating processed data 22 for the RU 24 can be dynamically updated to changing conditions, e.g., changes in the radio communications load being supported by the RU 24. Further, in one or more embodiments, rather than sending or updating the processing margin 28 with respect to each TTI or another radio-timing interval of interest, the RU 24 may send the processing margin 28 responsive to the processing margin 28 decreasing below a defined lower threshold or increasing above a defined upper threshold. Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method implemented by a computer apparatus operative as a resource management entity, wherein a radio unit (RU) of a split radio processing chain of a wireless communication network performs respective radio transmissions based on receiving corresponding baseband waveform data from a digital unit (DU) that is included in the split radio processing chain and implemented via an allocation of virtualized processing resources in a cloud computing center, the method comprising the resource management entity:

receiving successive indications of a processing margin at the RU, the processing margin indicating time differences between required times of the respective radio transmissions according to a defined radio timing structure and completion of processing by the RU of the corresponding baseband waveform data from the DU, and wherein the processing margin varies dynamically in dependence on a processing load at the DU; and dynamically adjusting the allocation of virtualized processing resources responsive to the received indications, to maintain the processing margin between an upper threshold and a lower threshold.

2. The method as recited in claim 1, wherein dynamically adjusting the allocation of virtualized processing resources comprises the resource management entity sending an instruction to a hypervisor in the cloud computing center, to modify an allocation of at least one of: a virtual processing core, a virtual memory, or virtualized resources associated with one or more FPGAs or other hardware-based accelerators.

3. The method as recited in claim 1, wherein dynamically adjusting the allocation of virtualized processing resources comprises:

increasing the allocation responsive to the processing margin falling below the lower threshold and thereby reducing a risk of radio timing violations by the split radio processing chain; and decreasing the allocation responsive to the processing margin rising above the upper threshold and thereby avoiding an over-allocation of virtualized processing resources to the DU.

4. The method as recited in claim 1, wherein the corresponding baseband waveform data for each respective radio transmission comprises digital waveform data for use by the RU in generating corresponding analog radio signals for transmission via one or more radio antennas.

5. The method as recited in claim 1, wherein the defined radio timing structure is used on a carrier signal used by the RU for performing the respective radio transmissions.

6. A resource management entity associated with a wireless communication network that includes a split radio processing chain comprising a radio unit (RU) that performs respective radio transmissions based on receiving corresponding baseband waveform data from a digital unit (DU) that is implemented via an allocation of virtualized processing resources in a cloud computing center, the resource management entity comprising:

communication circuitry configured to receive successive indications of a processing margin at the RU, the processing margin indicating time differences between required times of the respective radio transmissions according to a defined radio timing structure and completion of processing by the RU of the corresponding baseband waveform data from the DU, and wherein the processing margin varies dynamically in dependence on a processing load at the DU; and a processor configured to dynamically adjust the allocation of virtualized processing resources responsive to the received indications, to maintain the processing margin between an upper threshold and a lower threshold.

7. The resource management entity as recited in claim 6, wherein the RU reports the processing margin to the DU, and wherein the resource management entity is configured to receive the indications of the processing margin from the DU.

8. The resource management entity as recited in claim 6, wherein the processor is configured to adjust the allocation of virtualized processing resources responsive to the indication by:

increasing the allocation of virtualized processing resources responsive to the processing margin falling below the lower threshold, and thereby reducing a risk of radio timing violations by the split radio processing chain; and decreasing the allocation of virtualized processing resources responsive to the processing margin rising above the upper threshold, and thereby avoiding over-allocation of virtualized processing resources for the DU.

9. The resource management entity as recited in claim 6, wherein the corresponding baseband waveform data for each respective radio transmission comprises digital waveform data for use by the RU in generating corresponding analog radio signals for transmission via one or more radio antennas.

10. A method implemented by a radio unit (RU) that is included in a split radio processing chain of a wireless communication network, wherein the split radio processing chain further includes a digital unit (DU) and wherein the method comprises the RU:

performing respective radio transmissions based on receiving and processing corresponding baseband waveform data received from the DU, the respective radio transmissions performed by the RU at required times according to a defined radio timing structure;

measuring a processing margin on an ongoing basis, the processing margin varying dynamically in dependence on a processing load at the DU and measured as a difference between the required times for the respective radio transmissions and completion by the RU of processing the corresponding baseband waveform data; and reporting the processing margin to the DU on an ongoing basis, such that the DU is aware of the dynamic variations in the processing margin.

11. The method as recited in claim 10, wherein the corresponding baseband waveform data for each respective radio transmission by the RU comprises digital waveform data for use by the RU in generating corresponding analog radio signals for transmission via one or more radio antennas.

12. The method as recited in claim 10, wherein the respective radio transmissions by the radio unit are transmissions on a carrier signal having the defined radio timing structure.

13. A radio unit (RU) that is included in a split radio processing chain of a wireless communication network, wherein the split radio processing chain further includes a digital unit (DU), the RU comprising:

radio transmission circuitry configured to perform respective radio transmissions based on the RU receiving corresponding baseband waveform data from the DU, the respective radio transmissions performed at required times defined by a radio timing structure;

a processor configured to:

measure, on an ongoing basis, a processing margin, the processing margin varying dynamically in dependence on a processing load at the DU and measured as a difference between the required times for the respective radio transmissions and completion by the RU of processing the corresponding baseband waveform data; and communication circuitry associated with the processor, and wherein the processor is configured to report the processing margin to the DU on an ongoing basis via the communication circuitry, such that DU is aware of dynamic variations in the processing margin.

* * * * *